US009580603B2

(12) United States Patent
Wang et al.

(10) Patent No.: US 9,580,603 B2
(45) Date of Patent: Feb. 28, 2017

(54) RED THERMOCHROMIC DYES AND THEIR INK COMPOSITIONS

(71) Applicant: Chromatic Technologies, Inc., Colorado Springs, CO (US)

(72) Inventors: Ruizheng Wang, Colorado Springs, CO (US); Medhanei Abraha, Colorado Springs, CO (US); Yu Du, Colorado Springs, CO (US); Ross Haugberg, Colorado Springs, CO (US)

(73) Assignee: Chromatic Technologies, Inc., Colorado Springs, CO (US)

( * ) Notice: Subject to any disclaimer, the term of this patent is extended or adjusted under 35 U.S.C. 154(b) by 153 days.

(21) Appl. No.: 14/498,713

(22) Filed: Sep. 26, 2014

(65) Prior Publication Data

US 2015/0090159 A1  Apr. 2, 2015

Related U.S. Application Data

(60) Provisional application No. 61/883,935, filed on Sep. 27, 2013.

(51) Int. Cl.
| | |
|---|---|
| *C09D 11/037* | (2014.01) |
| *C09D 11/50* | (2014.01) |
| *C09D 5/00* | (2006.01) |
| *C09B 11/02* | (2006.01) |
| *C09B 11/24* | (2006.01) |
| *C09B 67/02* | (2006.01) |
| *C09B 67/22* | (2006.01) |

(Continued)

(52) U.S. Cl.
CPC ............... *C09B 11/02* (2013.01); *C09B 11/24* (2013.01); *C09B 67/0034* (2013.01); *C09B 67/0097* (2013.01); *C09D 5/00* (2013.01); *C09D 5/29* (2013.01); *C09D 7/007* (2013.01); *C09D 11/037* (2013.01); *C09D 11/50* (2013.01)

(58) Field of Classification Search
CPC ........ C09D 11/037; C09D 11/50; C09D 5/00; C09D 7/007; C09B 11/02; C09B 11/24; C09B 67/0034; C09B 67/0097
USPC ................... 106/31.49, 494, 498; 548/357.7
See application file for complete search history.

(56) References Cited

U.S. PATENT DOCUMENTS

| | | | |
|---|---|---|---|
| 3,617,335 A | 11/1971 | Kimura et al. | |
| 3,697,540 A * | 10/1972 | Kimura .................. | B41M 5/145 548/357.5 |

(Continued)

FOREIGN PATENT DOCUMENTS

| | | |
|---|---|---|
| EP | 0908501 A1 | 4/1999 |
| GB | 1264636 A | 2/1972 |
| JP | 2003186242 | 7/2003 |

OTHER PUBLICATIONS

Corresponding PCT International Patent Application No. PCT/US2014/057844; International Search Report and Written Opinion dated Dec. 22, 2014, 10 total pages.

*Primary Examiner* — Helene Klemanski
(74) *Attorney, Agent, or Firm* — Craig R. Miles; CR Miles P.C.

(57) ABSTRACT

A red leuco dye demonstrates unusually good thermal and photo stability. The red dye may be used with developers and wax carries for microencapsulation to form thermochromic pigments for use in inks, coatings and the like. This pigment is particularly desirable for use in metal-deco coatings, such as those used in aluminum cans in high beverage canning operations.

16 Claims, 9 Drawing Sheets

(51) Int. Cl.
*C09D 5/29* (2006.01)
*C09D 7/00* (2006.01)

(56) References Cited

U.S. PATENT DOCUMENTS

| | | | |
|---|---|---|---|
| 3,974,175 A * | 8/1976 | Garner | C09B 11/26 |
| | | | 106/31.49 |
| 3,985,376 A | 10/1976 | Baumann et al. | |
| 4,363,503 A | 12/1982 | Schmidt et al. | |
| 4,421,560 A | 12/1983 | Kito et al. | |
| 4,425,161 A | 1/1984 | Shibahashi et al. | |
| 4,480,096 A | 10/1984 | Fletcher | |
| 4,720,301 A | 1/1988 | Kito et al. | |
| 4,854,332 A | 8/1989 | Hanakura | |
| 4,933,448 A * | 6/1990 | Fletcher | B41M 5/145 |
| | | | 548/357.5 |
| 5,219,625 A | 6/1993 | Matsunami | |
| 5,389,489 A * | 2/1995 | Yanagihara | C09B 11/28 |
| | | | 430/138 |
| 5,558,700 A | 9/1996 | Shibahashi et al. | |
| 5,591,255 A | 1/1997 | Small et al. | |
| 5,997,849 A | 12/1999 | Small et al. | |
| 6,015,907 A | 1/2000 | Marshall | |
| 6,048,387 A * | 4/2000 | Shibahashi | B41M 5/305 |
| | | | 106/31.21 |
| 6,139,779 A | 10/2000 | Small et al. | |
| 6,494,950 B1 | 12/2002 | Fujita et al. | |
| 7,351,362 B2 | 4/2008 | Yasuda | |
| 7,494,537 B2 | 2/2009 | Ono et al. | |
| 8,222,183 B2 | 7/2012 | Ono | |
| 9,315,672 B2 * | 4/2016 | Ichikawa | C09B 11/24 |
| 9,399,716 B2 * | 7/2016 | Wang | C09D 11/50 |
| 2003/0087757 A1 | 5/2003 | Kubota et al. | |
| 2003/0089270 A1 | 5/2003 | Shen et al. | |

* cited by examiner

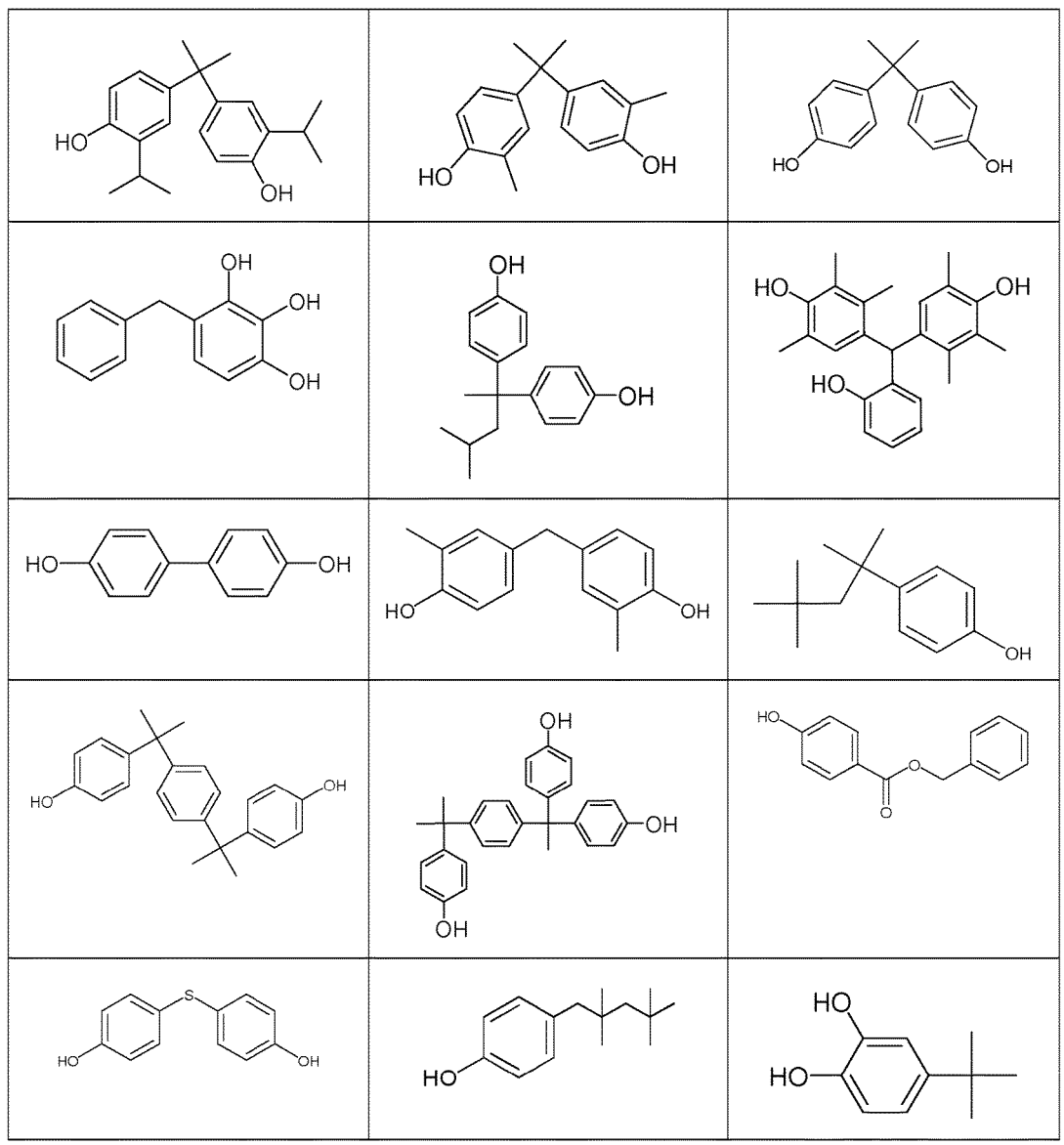
FIG. 2, cont'd

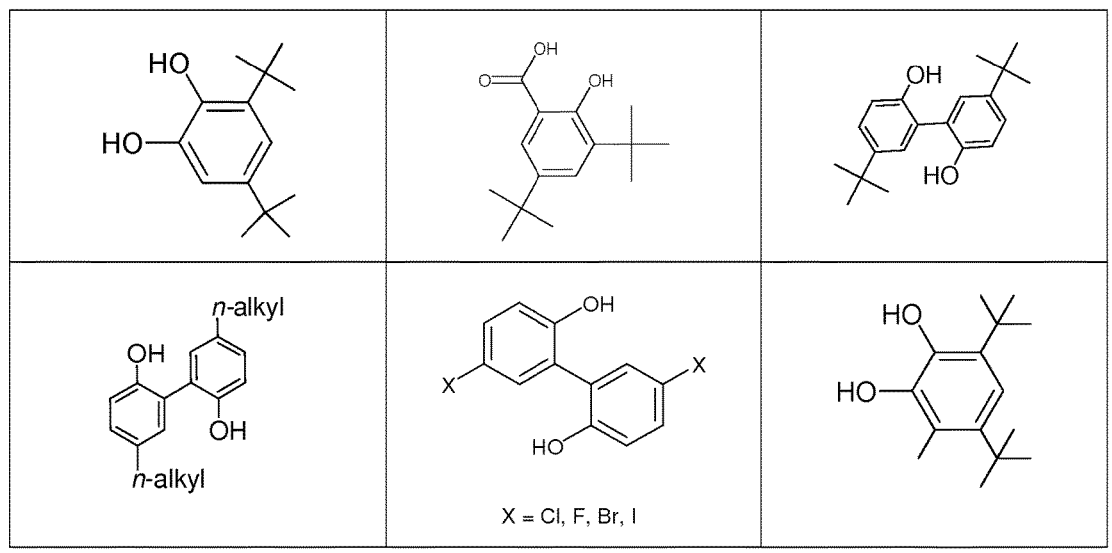
FIG. 2, cont'd

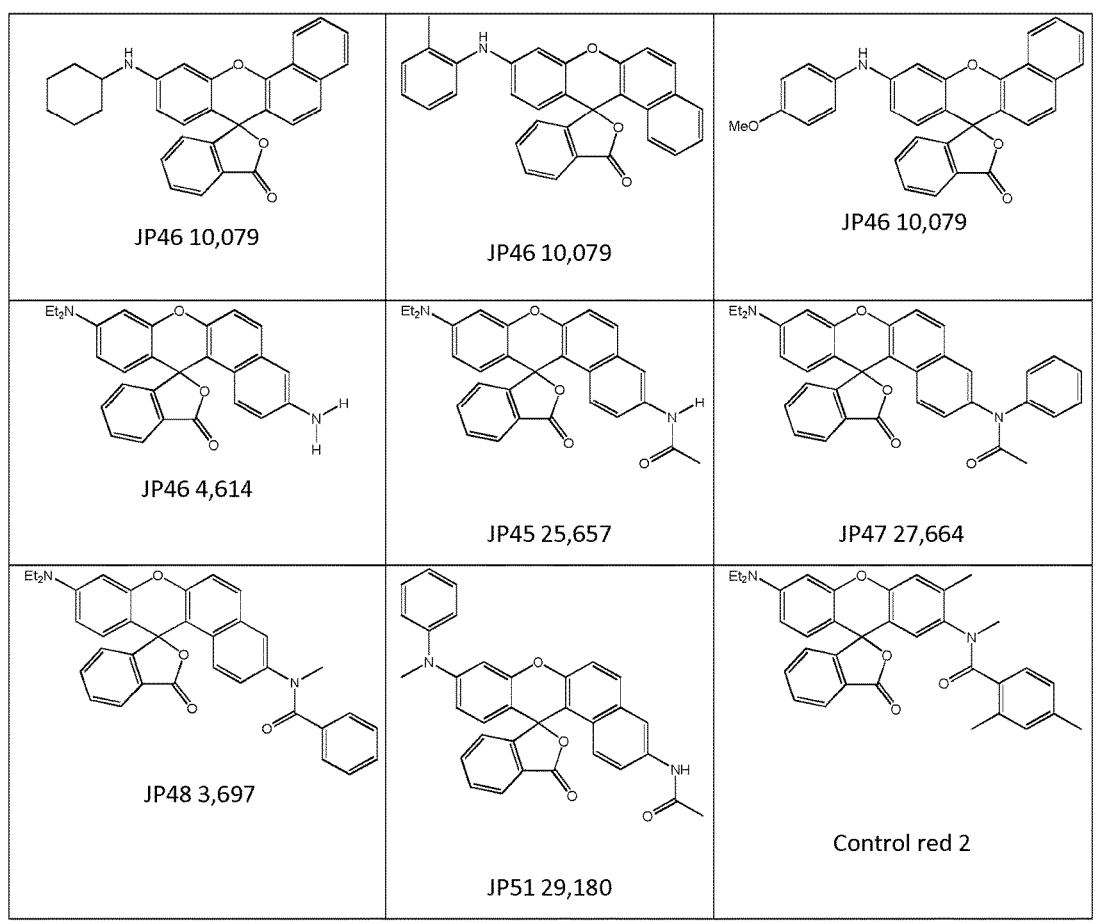
FIG. 3, cont'd

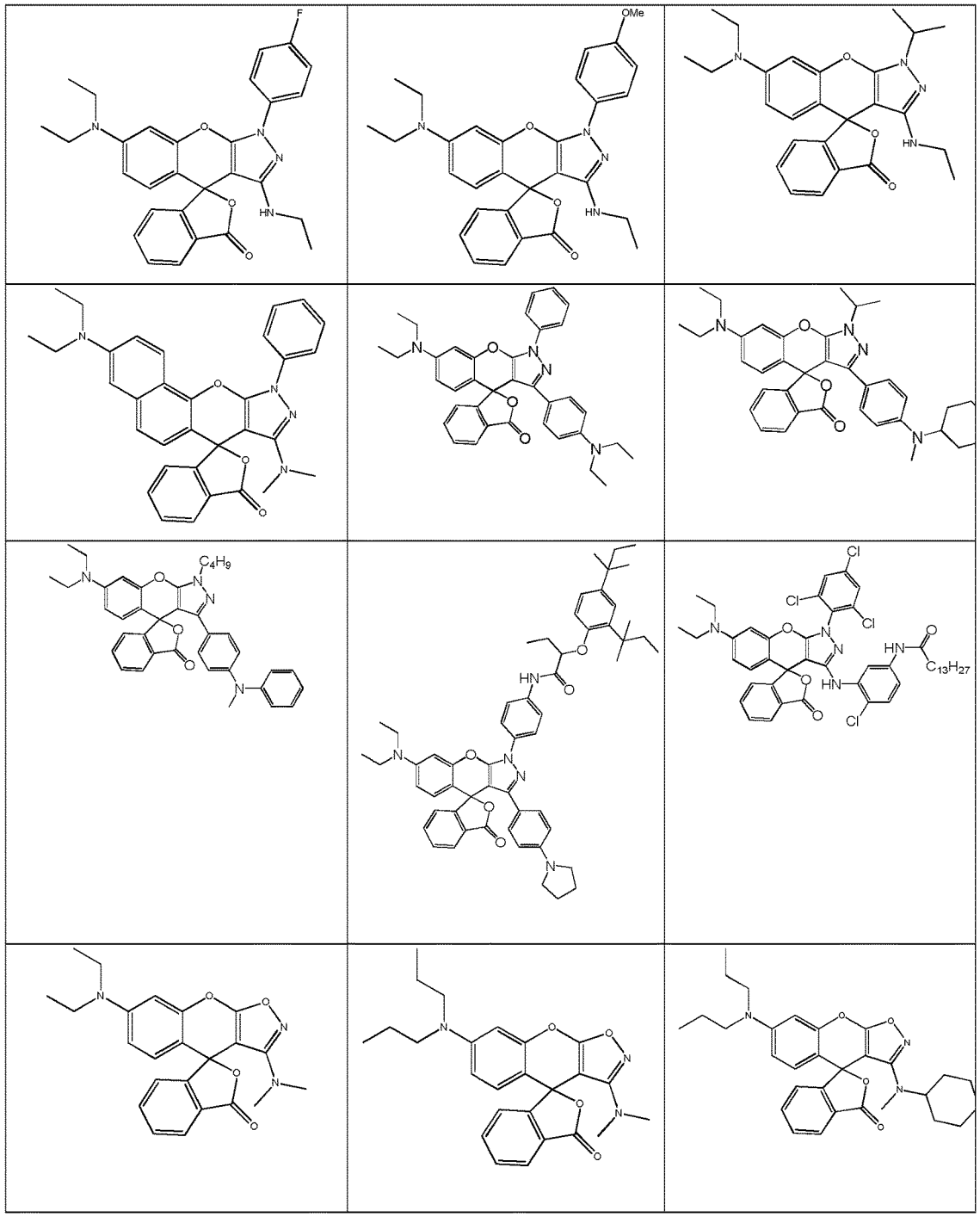
FIG. 4, cont'd

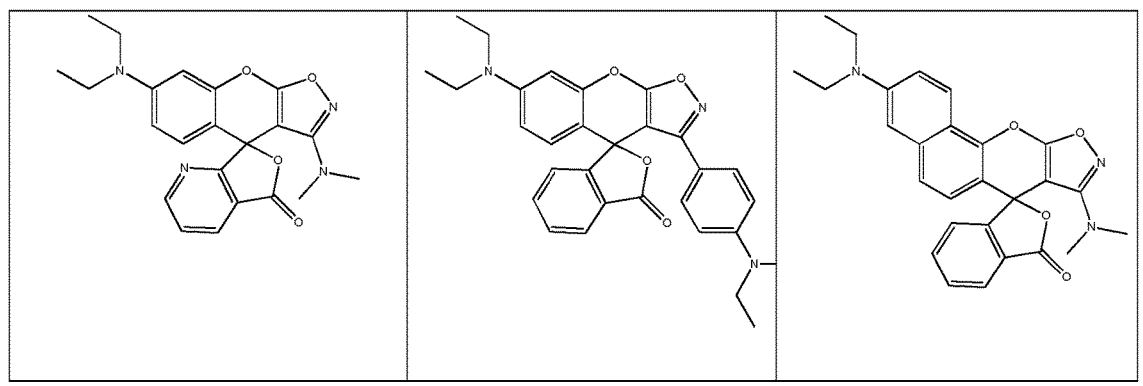
FIG. 4, cont'd

RED THERMOCHROMIC DYES AND THEIR INK COMPOSITIONS

RELATED APPLICATIONS

This application claims benefit of priority to U.S. Provisional patent Application No. 61/883,935 filed Sep. 27, 2013, which is hereby incorporated by reference to the same extent as though fully replicated herein.

THERMOCHROMIC DYES AND INKS

Dyes that change color over a range of temperatures are known as thermochromic dyes. These dyes are used in a leuco dye system formed as a combination of a color former and a developer. These materials are found to generate absorption densities from the leuco dyes when formulated with a carrier that contains one or more fatty ester, fatty alcohol, and fatty amide also known as solvents. The combination of leuco dyes, developers and carrier materials may be used in any combination to achieve desired characteristics and functionalities.

Thermochromic dyes can be manufactured to have a color change that is reversible or irreversible. Formulated as inks or dyes, they are used in a variety of applications such as plastic masterbatch, paper, textiles, coatings, offset ink, metal decorating inks and coatings, ultraviolet radiation curable inks and coatings, solvent based inks and coatings, screen inks and coatings, gravure inks and coatings, paints, security printing, brand protection, smart packaging, marketing and novelty printing, among other uses.

Thermochromic dyes are part of a interacting system known as thermochromic pigment. The parts of the pigment system are leuco dyes acting as colorants, weak organic acids acting as color developers and solvents that variably interact with components of the system according to the temperature of the system. Thermochromic pigments are microencapsulated in a protective coating to protect the contents from undesired effects from the environment. Each microcapsule is self-contained, having all of the components of the entire system required to reproduce the color change. The components of the system interact with one another differently at different temperatures. Generally, the system is ordered and colored below a temperature corresponding to the full color point. The system becomes increasingly unordered and starts to lose its color at a temperature corresponding to a predetermined activation temperature.

Below the activation temperature, the system is colored and above the activation temperature they are clear or lightly colored. The activation temperature corresponds to a range of temperatures at which the transition is taking place between the full color point and the clearing point. Generally, the activation temperature is defined as the temperature at which the human eye can perceive that the system is starting to lose color, or alternatively, starting to gain color. Presently, thermochromic systems are designed to have activation temperatures over a broad range, from about −20° C. to about 80° C. or more. With heating, the system becomes increasingly unordered and continues to lose its color until it reaches a level of disorder at a temperature corresponding to a clearing point. At the clearing point, the system lacks any recognizable color.

Specific thermochromic pigment formulations are known in the art. See, for example, U.S. Pat. Nos. 4,720,301, 5,219,625 5,558,700, 5,591,255, 5,997,849, 6,139,779, 6,494,950 and 7,494,537, all of which are expressly incorporated herein by reference to the same extent as though fully replicated herein. These thermochromic pigments are known to use various components in their formulations, and are generally reversible in their color change. Thermochromic pigments are available in various colors, with various activation temperatures, clearing points and full color points. Thermochromic pigments may be mixed with vehicles for form vari0ous coatings, such as inks that may be printed by offset litho, dry offset, letterpress, gravure, flexo and screen processes, amongst others.

Thermochromic inks and other coatings that contain leuco dyes are available for all major ink types such as water-based, ultraviolet cured and epoxy. The properties of these inks differ from process inks in ways that cause certain problems. For example, most thermochromic inks contain the thermochromic systems as microcapsules, which are not inert and insoluble as are ordinary process pigments. The size of the microcapsules containing the thermochromic systems may range, for example, between 3-5 µm which is more than 10-times larger than regular pigment particles found in most inks.

The post-print functionality of thermochromic inks can be adversely affected by ultraviolet light, temperatures in excess of 140° C. and aggressive solvents. The lifetime of these inks is sometimes very limited because of the degradation caused by exposure to ultraviolet light from sunshine. Thus, there is a need in the art for thermochromic systems including dyes, inks, and coatings demonstrating resistance to degradation from exposure to ultraviolet light.

As is known in the art, the color transition range of microencapsulated thermochromic systems may be adjusted by shifting the full color point upward toward the clearing point, or shifting the clearing point downward toward the full color point, as explained in U.S. Pat. No. 6,494,950. These shifts are accomplished by adding high melting point materials to increase the full color point or, alternatively, by adding low melting point materials to the system to decrease the clearing point. Thus, the full color point or clearing point may be lowered or raised, but the overall temperature range between the two points remains unchanged because the amount of separation or width across the hysteresis window is left largely unaffected.

The most common thermochromic dyes used as color formers in thermochromic systems generally include, without limitation, spirolactones, fluorans, spiropyrans, and fulgides. More specifically; thermochromic dyes are based on diphenylmethane phthalide derivatives, phenylindolylphthalide derivatives, indolylphthalide derivatives, diphenylmethane azaphthalide derivatives, phenylindolylazaphthalide derivatives, fluoran derivatives, styrynoquinoline derivatives, and diaza-rhodamine lactone derivatives. These include: 3,3-bis(p-dimethylaminophenyl)-6-dimethylaminophthalide; 3-(4-diethylaminophenyl)-3-(1-ethyl-2-methylindol-3-yl) phthalide; 3,3-bis(1-n-butyl-2-methylindol-3-yl) phthalide; 3,3-bis(2-ethoxy-4-diethylaminophenyl)-4-azaphthalide; 3-[2-ethoxy-4-(N-ethylanilino)phenyl]-3-(1-ethyl-2-methylindol-3-yl)-4-azaphthalide; 3,6-dimethoxyfluoran; 3,6-di-n-butoxyfluoran; 2-methyl-6-(N-ethyl-N-p-tolylamino)fluoran; 3-chloro-6-cyclohexylaminofluoran; 2-methyl-6-cyclohexylaminofluoran; 2-(2-chloroanilino)-6-di-n-butylamino fluoran; 2-(3-trifluoromethylanilino)-6-diethylaminofluoran; 2-(N-methylanilino)-6-(N-ethyl-N-p-tolylamino) fluoran, 1,3-dimethyl-6-diethylaminofluoran; 2-chloro-3-methyl-6-diethylamino fluoran; 2-anilino-3-methyl-6-diethylaminofluoran; 2-anilino-3-methyl-6-di-n-butylamino fluoran; 2-xylidino-3-methyl-6-diethylaminofluoran; 1,2-benzo-6-diethylaminofluoran; 1,2-benzo-6-(N- ethyl-N-isobutylamino)fluoran, 1,2-benzo-6-(N-ethyl-N-isoamylamino)fluoran; 2-(3-methoxy-4-dodecoxystyryl)quinoline; spiro[5H-(1)benzopyrano(2,3-d)pyrimidine-5,1'(3'H)isobenzofuran]-3'-one; 2-(diethylamino)-8-(diethylamino)-4-methyl-spiro[5H-(1)benzopyrano(2,3-d)pyrimidine-5,1'(3'H)isobenzofuran]-3'-one; 2-(di-n-butylamino)-8-(di-n-butylamino)-4-methyl-spiro[5H-(1)benzopyrano(2,3-d)pyrimidine-5,1'(3'H)isobenzofuran]-3'-one; 2-(di-n-butylamino)-8-(diethylamino)-4-methyl-spiro[5H-(1)benzopyrano(2,3-d)pyrimidine-5,1'(3'H)isobenzofuran]-3'-one; 2-(di-n-butylamino)-8(N-ethyl-N-isoamylamino)-4-methyl-spiro[5H-(1)benzopyrano(2,3-d)pyrimidine-5,1'(3'H)isobenzofuran]-3'-one; and 2-(di-n-butylamino)-8-(di-n-butylamino)-4-phenyl and trisubstituted pyridines.

For example, fluoran based thermochromic dyes can provide variety of colors when contacted with suitable developers: The dyes shown in FIG. 1 are a few examples of such thermochromic leuco dyes.

Developers

Weak acids that can be used as color developers act as proton donors, changing the dye molecule between its leuco form and its protonated colored form; stronger acids make the change irreversible. Examples of developers used in the present disclosure include but are not limited to: bisphenol A; bisphenol F; tetrabromobisphenol A; 1'-methylenedi-2-naphthol; 1,1,1-tris(4-hydroxyphenyl)ethane; 1,1-bis(3-cyclohexyl-4-hydroxyphenyl)cyclohexane; 1,1-bis(4-hydroxy-3-methylphenyl)cyclohexane; 1,1-bis(4-hydroxyphenyl)cyclohexane; 1,3-bis[2-(4-hydroxyphenyl)-2-propyl]benzene; 1-naphthol; 2-naphthol; 2,2 bis(2-hydroxy-5-biphenylyl)propane; 2,2-bis(3-cyclohexyl-4-hydroxy)propane; 2,2-bis(3-sec-butyl-4-hydroxyphenyl)propane; 2,2-bis(4-hydroxy-3-isopropylphenyl)propane; 2,2-bis(4-hydroxy-3-methylphenyl)propane; 2,2-bis(4-hydroxyphenyl)propane; 2,3,4-trihydroxydiphenylmethane; 4,4'-(1,3-Dimethylbutylidene)diphenol; 4,4'-(2-Ethylidene)diphenol; 4,4'-(2-hydroxybenzylidene)bis(2,3,6-trimethylphenol); 4,4'-biphenol; 4,4'-dihydroxydiphenyl ether; 4,4'-dihydroxydiphenylmethane; 4,4'-methylidenebis(2-methylphenol); 4-(1,1,3,3-tetramethylbutyl)phenol; 4-phenylphenol; 4-tert-butylphenol; 9,9-bis(4-hydroxyphenyl)fluorine; 4,4'-(ethane-1,1-diyl)diphenol; alpha,alpha'-bis(4-hydroxyphenyl)-1,4-diisopropylbenzene; alpha,alpha,alpha'-tris(4-hydroxyphenyl)-1-ethyl-4-isopropylbenzene; benzyl 4-hydroxybenzoate; bis(4-hydroxyphenyl)sulfide; bis(4-hydroxyphenyl)sulfone; propyl 4-hydroxybenzoate; methyl 4-hydroxybenzoate; resorcinol; 4-tert-butyl-catechol; 4-tert-butyl-benzoic acid; 1,1'-methylenedi-2-naphthol 1,1,1-tris(4-hydroxyphenyl)ethane; 1,1-bis(3-cyclohexyl-4-hydroxyphenyl)cyclohexane; 1,1-bis(4-hydroxy-3-methylphenyl)cyclohexane; 1,1-bis(4-hydroxyphenyl)cyclohexane; 1,3-bis[2-(4-hydroxyphenyl)-2-propyl]benzene; 1-naphthol 2,2'-biphenol; 2,2-bis(2-hydroxy-5-biphenylyl)propane; 2,2-bis(3-cyclohexyl-4-hydroxyphenyl)propane; 2,2-bis(3-sec-butyl-4-hydroxyphenyl)propane; 2,2-bis(4-hydroxy-3-isopropylphenyl)propane; 2,2-bis(4-hydroxy-3-methylphenyl)propane; 2,2-bis(4-hydroxyphenyl)propane; 2,3,4-trihydroxydiphenylmethane; 2-naphthol; 4,4'-(1,3-dimethylbutylidene)diphenol; 4,4'-(2-ethylhexylidene)diphenol 4,4'-(2-hydroxybenzylidene)bis(2,3,6-trimethylphenol); 4,4'-biphenol; 4,4'-dihydroxydiphenyl ether; 4,4'-dihydroxydiphenylmethane; 4,4'-ethylidenebisphenol; 4,4'-methylenebis(2-methylphenol); 4-(1,1,3,3-tetramethylbutyl)phenol; 4-phenylphenol; 4-tert-butylphenol; 9,9-bis(4-hydroxyphenyl)fluorine; alpha,alpha'-bis(4-hydroxyphenyl)-1,4-diisopropylbenzene; α,α,α-tris(4-hydroxyphenyl)-1-ethyl-4-isopropylbenzene; benzyl 4-hydroxybenzoate; bis(4-hydroxyphenyl) sulfidem; bis(4-hydroxyphenyl) sulfone methyl 4-hydroxybenzoate; resorcinol; tetrabromobisphenol A; derivative salts of salicylic acid such as 3,5-di-tertbutyl-salicylic acid; zinc 3,5-di-tertbutylsalicylate; 3-phenyl-salicylic acid; 5-tertbutyl-salicylic acid; 5-n-octyl-salicylic acid; 2,2'-biphenol; 4,4'-di-tertbutyl-2,2'-biphenol; 4,4'-di-n-alkyl-2,2'-biphenol; and 4,4'-di-halo-2,2'-biphenol, wherein the halo is chloro, fluoro, bromo, or iodo. Selected structures of the developers are listed in Table 2.

Solvents for the Internal Phase

The best solvents to use within the thermochromic system are those that have low reactivity, have a relatively large molecular weight (i.e. over 100), and which are relatively non-polar. U.S. Pat. No. 6,139,779 teaches that it is desirable to minimize the use of certain solvents and other compounds that degrade or destroy the color performance of the dye. In particular, aldehydes, ketones, and diols should be removed from the formulation and replaced with solvents that do not adversely affect the thermochromic pigment. In this regard, solvents having a large molecular weight (i.e. greater than 100) generally are compatible with the thermochromic pigments. The acid content of the formulation may also be adjusted to a value of less than 20 or adjusted to be neutral in the range from 6.5-7.5 pH. These adjustments allow the thermochromic dyes to be added to the formulation without a loss of its color change properties.

Solvents and/or co-solvents used in thermochromic generally may include, but are not limited to: aldehydes, thiols, sulfides, ethers, ketones, esters, alcohols, and acid amides. These solvents can be used alone or in mixtures of 2 or more. Examples of the ethers include, but are not limited to: aliphatic ethers having 10 or more carbon atoms and aromatic ethers. Examples of ketone solvents include, but are not limited to aliphatic ketones having 10 or more carbon atoms and alicyclic ketones. Examples of the ester solvents may be selected from esters of a saturated fatty acid with a branched aliphatic alcohol, esters of an unsaturated fatty acid or a saturated fatty acid having one or more branches or substituents with an aliphatic alcohol having one or more branches or 16 or more carbon atoms. Examples of the alcohol solvents include, without limitation, monohydric aliphatic saturated alcohols, alicyclic alcohols and aromatic alcohols.

Certain solvents reduce the hysteresis window. The solvent may be material combined with the thermochromic system, for example, to reduce thermal separation across the hysteresis window to a level demonstrating 80%, 70%, 50%, 40%, 30% or less of the thermal separation that would exist if the co-solvent were not present. The co-solvent can be selected from the group consisting of derivatives of myristic acid, derivatives of behenyl acid, derivatives of palmytic acid and combinations thereof. Generally, these materials include myristates, palmitates, behenates, together with myristyl, stearyl, and behenyl materials and certain alcohols. In one aspect, these materials are preferably solvents and co-solvents from the group including isopropyl myristate, isopropyl palmitate, methyl palmitate, methyl stearate, myristyl myristate, cetyl alcohol, stearyl alcohol, behenyl alcohol, stearyl behenate, and stearamide. These co-solvents are added to the encapsulated thermochromic system in an amount that, for example, ranges from 9% to 18% by weight of the thermochromic system as encapsulated, i.e., excluding the weight of the capsule. This range is more preferably from about 12% to about 15% by weight.

Stabilizers

In other instances, additives used to fortify the encapsulated thermochromic systems by imparting a resistance to degradation by ultraviolet light by have a dual functionality of also reducing the width of separation over the hysteresis window. Light stabilizers are additives which prevent degradation of a product due to exposure to ultraviolet radiation. These compounds may include blocked phenols, singlet oxygen quenchers, UVA/B absorbers, borotriazoles, and hindered amino light stabilizers (HALS). Specific examples of light stabilizers used in thermochromic systems of the present disclosure and which may also influence the hysteresis window include but are not limited to: avobenzone, bisdisulizole disodium, diethylaminohydroxybenzoyl hexyl benzoate, Ecamsule, methyl anthranilate, 4-aminobenzoic acid, Cinoxate, ethylhexyl triazone, homosalate, 4-methylbenzylidene camphor, octyl methoxycinnamate, octyl salicylate, Padimate O, phenylbenzimidazole sulfonic acid, polysilicone-15, trolamine salicylate, bemotrizinol, benzophenones 1-12, dioxybenzone, drometrizole trisiloxane, iscotrizinol, octocrylene, tetrakis-(methylene-(3,5-di-(tert)-butyl-4-hydrocinnamate)) methane, oxybenzone, sulisobenzone, bisoctrizole, titanium dioxide, zinc oxide, and sterically hindered phenols such as pentaerythritol tetrakis(3-(3,5-di-tert-butyl-4-hydroxyphenyl) propionate sold as Irganox 1010® by Ciba Specialty Chemicals Inc. of Tarrytown N.Y.

Metal Deco Applications

In recent years, metal decoration inks have been adapted for use or thermochromic pigments in high speed commercial canning operations. Most metal beverage cans made in the United States are manufactured from aluminum. In Europe and Asia, approximately 55 percent of cans are made of steel and 45 percent are aluminum alloy. Aluminum cans may contain an internal coating to protect the aluminum from beverage corrosion. Chemical compounds used in the internal coating of the can include types of epoxy resin.

Beverage cans are usually filled before the top is crimped in place. The filling and sealing operations are fast and precise. The filling head centers over the can and discharges the beverage to flow down the sides of the can. The lid is placed on the can then crimped in two operations. A seaming head engages the lid from above while a seaming roller to the side curls the edge of the lid around the edge of the can body. The head and roller spin the can in a complete circle to seal all the way around. A pressure roller next drives the two edges together under pressure to make a gas-tight seal. Filled cans usually have pressurized gas inside, which stiffens the filled cans for subsequent handling.

Aluminum cans may be produced through a mechanical cold forming process starting with punching a flat blank from very stiff cold-rolled sheet. This sheet is often made of a material called alloy 3104-H19 or 3004-H19. This material is aluminum with about 1% manganese and 1% magnesium for strength and formability. A flat blank is first formed into a cup about three inches in diameter. This cup is then pushed through a forming process called "ironing" which forms the can. The bottom of the can is also shaped at this time. The malleable metal deforms into the shape of an open-top can.

The coating may be roller-coated onto coil stock aluminum or Aluminum cans. These components may be selected from the group consisting of beverage can ends, beverage can tabs, bottle caps, and/or beverage container closures. The aluminum is preferably an alloy that is commonly used in canning operations, such as aluminum alloy 5182-H48.

The coating process preferably occurs in one or more coats to yield a dried film with a thickness ranging from 1 mg/in$^2$ up to 5.5 mg/in$^2$.

Exterior surfaces of the cans may be coated with inks as shown, by way of example, in U.S. Pat. No. 6,494,950. Polyester resins are often favored for use on the sides of the cans. Epoxy resins are favored for use on the lids, especially where there is a need for improved durability of the coatings. Thermochromic inks may be used as indicators to assess when beverages have reached a particular temperature, such as when a soft drink or a beer is at a temperature that is particularly pleasing to the palate. A variety of polyester-based thermochromic inks are commercially available for coating the sides of the cans. Practically speaking, epoxy-based thermochromic inks are not widely available.

In one embodiment, a thermochromic metal decoration ink formulation includes:

| Ingredient | Weight Percent of Coating |
|---|---|
| Pigment* | 1% to 40% |
| Light Stabilizer | 1% to 5% |
| Vehicle | |
| Polymerizable resin | 5% to 30% |
| Dispersing agent | 0% to 5% |
| Solvent | 0% to 50% |
| Curing agent | 0% to 25% |
| Catalyst | 0% to 5% |

*Assessed by solids content upon complete drying of pigment capsules, but does not need to be dried.

In one example of this, a thermochromic pigment may be formulated to use melamine formaldehyde microcapsules having an average diameter from 700 nm to 3 microns. This makes a very good metal decoration ink for high speed application to a metal can where the line speed of the can coater may be as high as 2000 cans per minute. The use of thermochromic metal decorating ink increasingly becomes a limiting factor at higher productions line speeds. Problems arise in the ink rheology with this particle size that leads to misting as the ink is transferred at very high speed.

Conventional thermochromic systems are prepared by combining a color forming molecule or molecules such as leuco dyes that are capable of extended conjugation by proton gain or electron donation; a color developer or developers that donate a proton or accept an electron; and a single solvent or a blend of co-solvents. The solvent or blend of co-solvents is chosen based on individual melting point and also the resulting thermochromic temperature range of the system. These formulations form an internal phase that is then microencapsulated by a polymeric shell. The microcapsules are referred to as thermochromic pigment.

Thermochromic dye is often used in slurry of encapsulated dye in a water base. It happens that the pH of this slurry is most often neutral in a range from 6.5 to 7.5. When thermochromic dye is added to a formulation that has a pH outside this range, the color change properties are often always lost. This is an irreversible effect and therefore, it is important to adjust the pH prior to adding the thermochromic dye.

One technique used to produce the thermochromic encapsulated dye is to combine water, dye, and oil, with melamine formaldehyde resin and agitate to create a very fine emulsification. Interfacial tensions are such that the oil and dye end up on the inside of a melamine formaldehyde capsule distributed in primarily the water phase. The melamine formaldehyde substance, while very hard and resistant to breakdown at high temperature, is permeable.

The inks are made in such a way that very small capsules are formed with a particle size from 400 nm-1.6 microns. Such inks show considerably less misting and better transfer to metal cans at high production speeds. The small particle size also facilitates the commercial use of thermochromic pigments in systems where larger particle size is problematic. By way of example, printed images may now be provided with finer lines and sharper definition than was previously impossible.

U.S. Pat. Nos. 4,421,560 and 4,425,161 entitled "Thermochromic Materials" both state that thermochromic inks can be made with "conventional additives used to improve conventional printing inks."

Several types of ingredients are traditionally added to ink formulations. The combination of all the ingredients in an ink, other than the pigment, is called the vehicle. The vehicle carries the pigment to the substrate and binds the pigment to the substrate. The correct combination of vehicle ingredients will result in the wetting of an ink. This wetting means that the vehicle forms an absorbed film around the pigment particles. The main ingredient in an ink is the binder. This may be a resin, lacquer or varnish or some other polymer. The binder characteristics vary depending on the type of printing that is being done and the desired final product. The second main ingredient is the colorant itself, for example, as described above. The remaining ingredients are added to enhance the color and printing characteristics of the binder and the colorant. These remaining ingredients may include reducers (solvents), waxes, surfactant, thickeners, driers, and/or UV inhibitors.

Prior Art on Red Thermochromic Dyes

Red thermochromic pigments are especially known in the art as being associated with heat and UV instability problems. Thus, the red pigments are often not adopted in challenging environments of use, such as is creates special difficulties in the metal deco environment of use. Several classes of red thermochromic dyes are reported in prior art. One of the most dominating classes belongs to fluorans that develop red shade color with suitable developers. These include the examples shown in FIG. 3: These dyes or color formers generally develop red color in shades ranging from yellowish red to vermilion. However, they share a common major issue: all of them are lack of UV light stability. All the inks made from these dyes failed to achieve our desired stability test, they did not last more than one hour under QSUN.

Another approach to producing red color is to mix a magenta dye with an orange dye in a proper ratio. For example, when a 4 part magenta dye is mixed with 1 part orange dye, a nice looking red color is produced when developed. However, these two dyes belong to different dye classes, they have different light stabilities. If one dye fades more quickly than the other, the red color made from these two dyes may show different color shade overtime. Also, the red color density needs to improve. Therefore a single red dye with improved light stability and color density is highly desired.

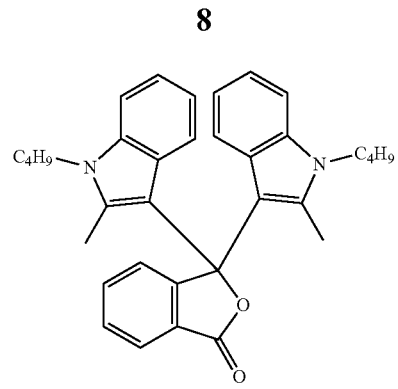

Magenta

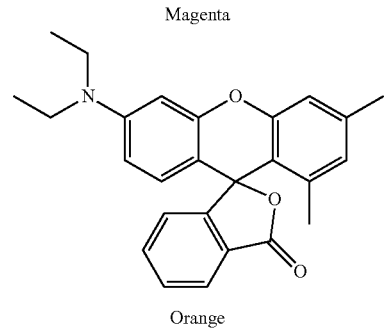

Orange

Another approach to producing red color dye is to modify a known black dye scaffold, which is very cheap due to its mass production. Specifically, when one black dye was treated with acetic anhydride in the presence of catalytic amount of pyridine at refluxing temperature, the black dye turned to a red dye. Despite easy synthesis, the red dye failed to provide desired stability requirement.

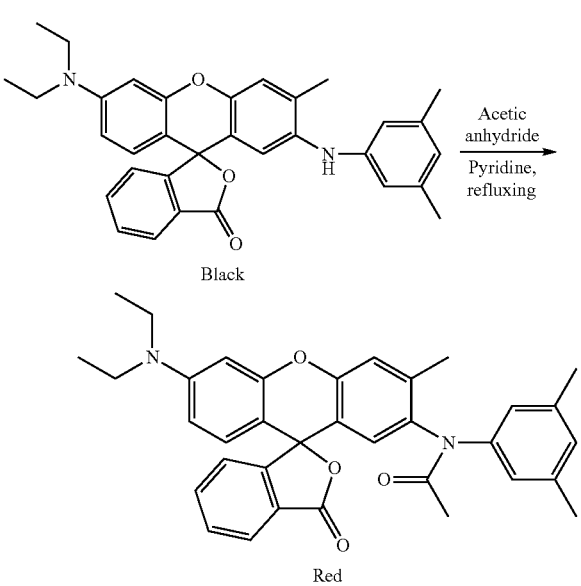

SUMMARY OF THE INVENTION

The presently disclosed instrumentalities provide a novel red dye chromophore based on a yellow dye scaffold. The resulting red dye has excellent thermal and photo stability.

Specifically, this invention relates to a novel red dye chromophores and associated ink compositions incorporating this red dye plus compatible developers, and fats for use in thermochromic systems, including especially microencapsulated thermochromic systems as described above. The red inks can be used alone or together with other colored inks on cans as beer or other beverage temperature indicator.

The novel red dyes disclosed in this invention have the following general Formula (I):

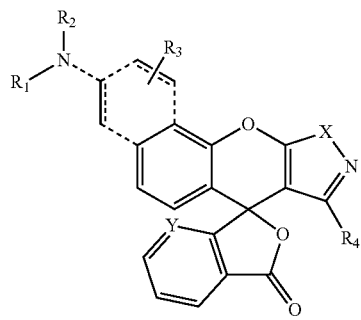

Chromophore I

Wherein the dashed line (represented by - - - ) represents an optional bond;

X can at least one of be nitrogen substituted by hydrogen or alkyl/aryl groups, oxygen, sulfur and combinations of these elements;

Y can be at least one of methine (CH) or nitrogen;

$R_1$ and $R_2$ can be the same or different, they can be independently selected from at least one of hydrogen, substituted or non-substituted alkyl or aryl groups, the two alkyl groups together with the nitrogen atom to which they are attached form a morpholinyl ring; the $NR_1R_2$ group can be attached to the phenyl moiety as well as the naphthyl moiety;

the $R_3$ group on either the phenyl or naphthyl moieties can be at least one of H, halogen, nitro, amine or substituted amine, alkyl or substituted alkyl, as well as phenyl or substituted phenyl groups;

$R_4$ can be at least one of amino, mono- or bis-substituted alkyl or phenyl amino group, $R_4$ can also be phenyl group with the para-position substituted by dialkylamino group.

DETAILED DESCRIPTION

Figure 1:
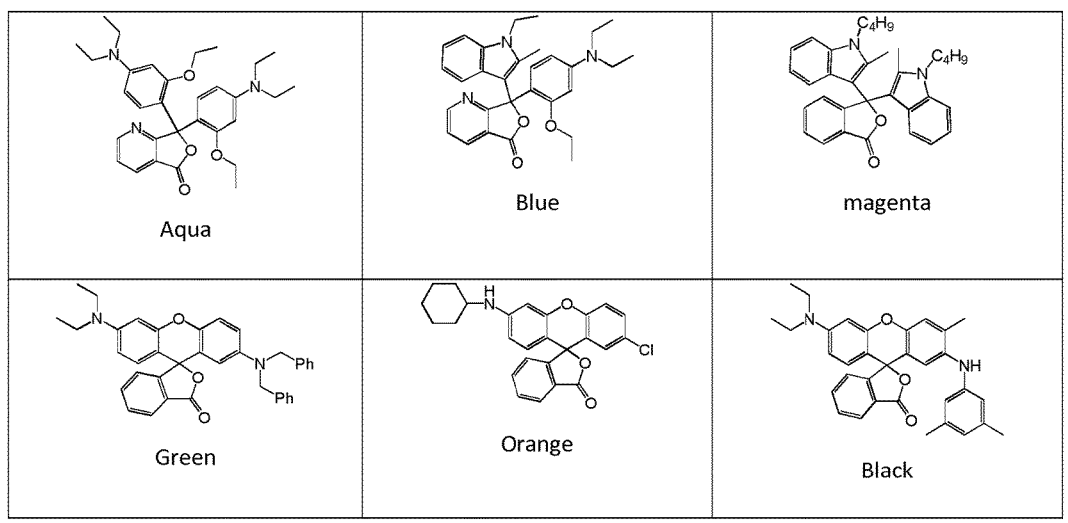
FIG. 1 depicts exemplary chemical compositions of various thermochromic leuco dyes.

The red thermochromic dyes disclosed herein are synthesized, by way of example, based on the general synthetic scheme below:

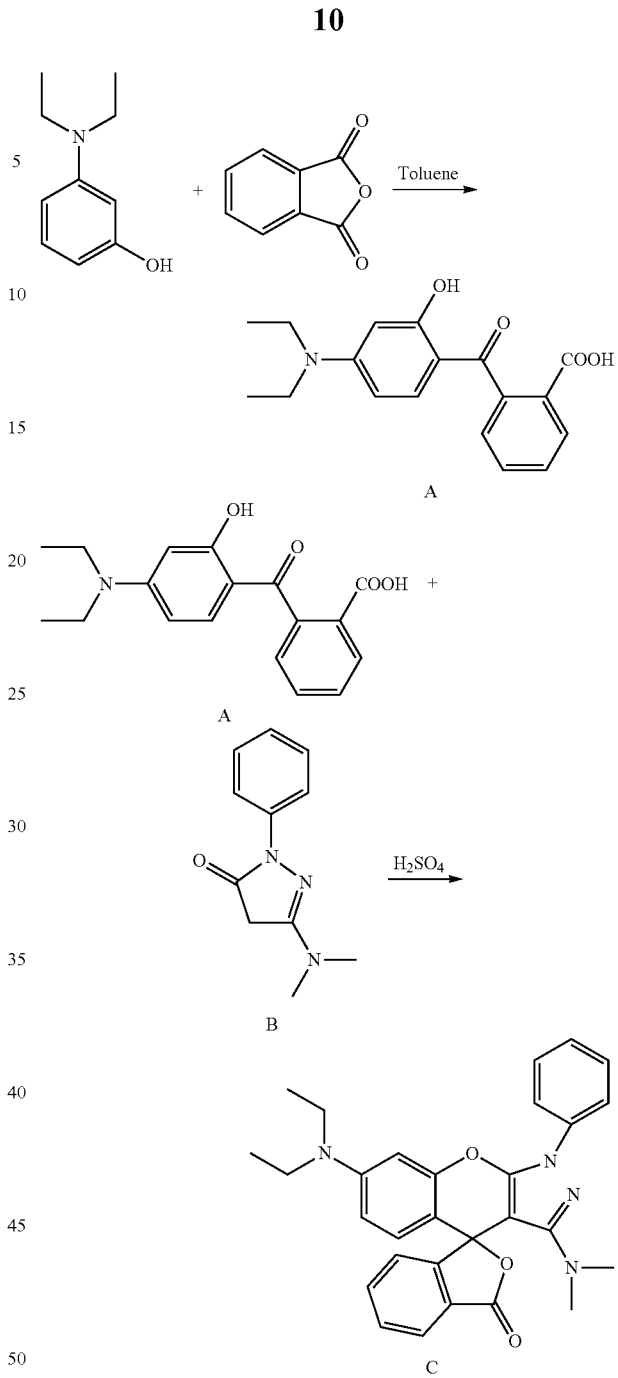

Synthesis Example

A mixture of 3-diethyl aminophenol (165 g, 1 mol) and phthalic anhydride (148 g, 1 mol) in toluene (400 ml) was refluxed overnight, it was then cooled to RT and the solid material was collected by filtration and washed with cold methanol and air dried, product A was obtained as light purplish powder, 250 gram, ~80% yield.

To a mixture of B (20.2 g, 0.1 mol) dissolved in concentrated $H_2SO_4$ (100 g) was added compound A (31.3 g, 0.1 mol) with stirring. The resulting mixture was then heated at 50~60° C. for 4 days with stirring. It was then cooled to RT, and poured to 500 ml ice-water with stirring, then 48% NaOH aqueous solution was added slowly to adjust the PH to ~4. The dark red color solid was formed and collected by vacuum filtration and washed with cold water. The solid was air-dried, and then suspended in a mixture of ethyl acetate (500 ml) and 5% NaOH (500 ml) and heated to reflux for 30 minutes. The organic layer was then collected, the aqueous layer was extracted with more ethyl acetate (100 ml), the combined organic layers were combined, and concentrated to dryness. The product was purified through a silica gel column using 1:1 ethyl acetate hexane as eluent to give a pale reddish solid when solvents were removed. 17 gram of the product C was obtained.

The resulting red dye was placed into a metal deco ink formulation and shows excellent properties. Inks of this class are thermally stable, they can survive 230 C.°/3 min of baking, and it can also last for more than 8 hours under QSUN, which is much improved over all the other red dyes in the prior art.

Figure 4:
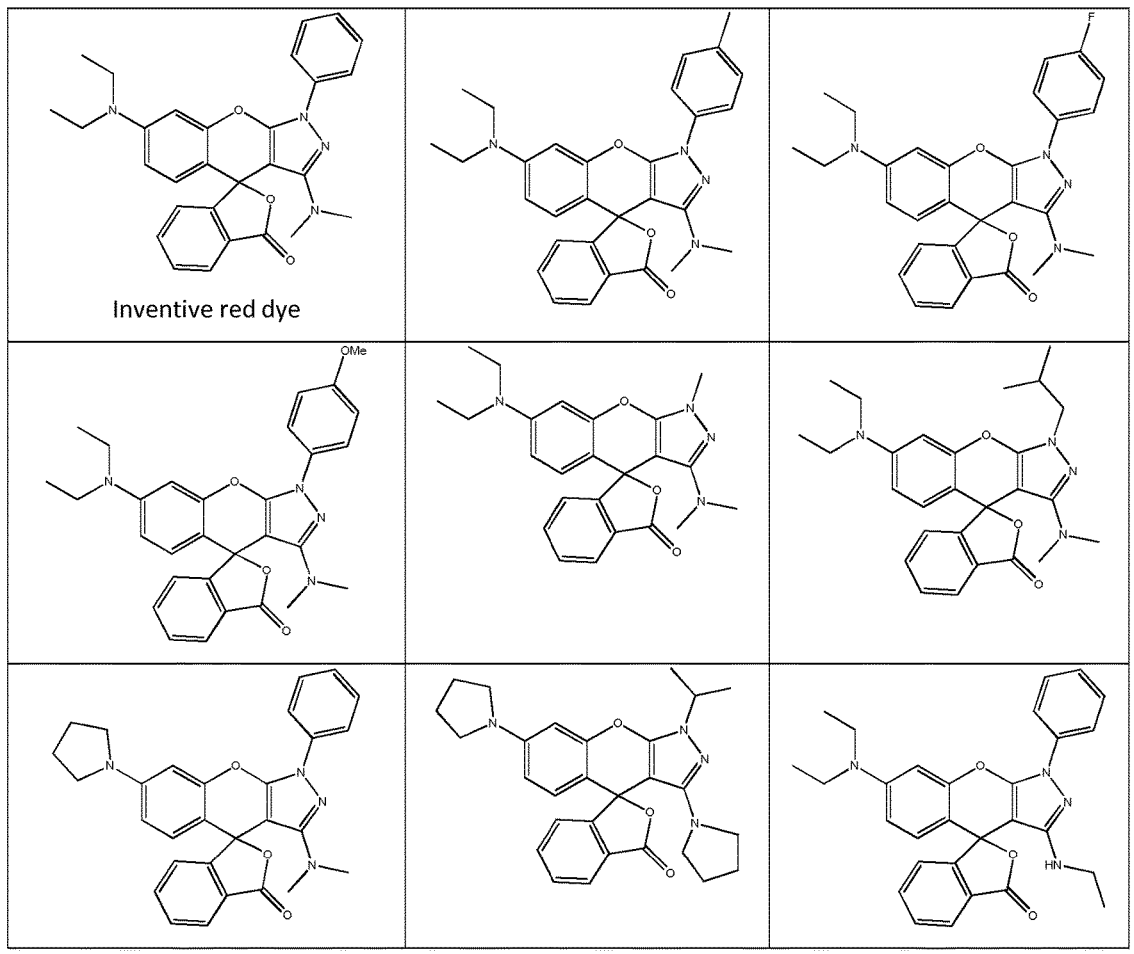
FIG. 4 depicts exemplary red leuco dyes that may be synthesized with the general scheme described below.

Red leuco dyes that can be synthesized with the general scheme described above include, but are not limited to, the following dyes listed in FIG. 4

Figure 2:
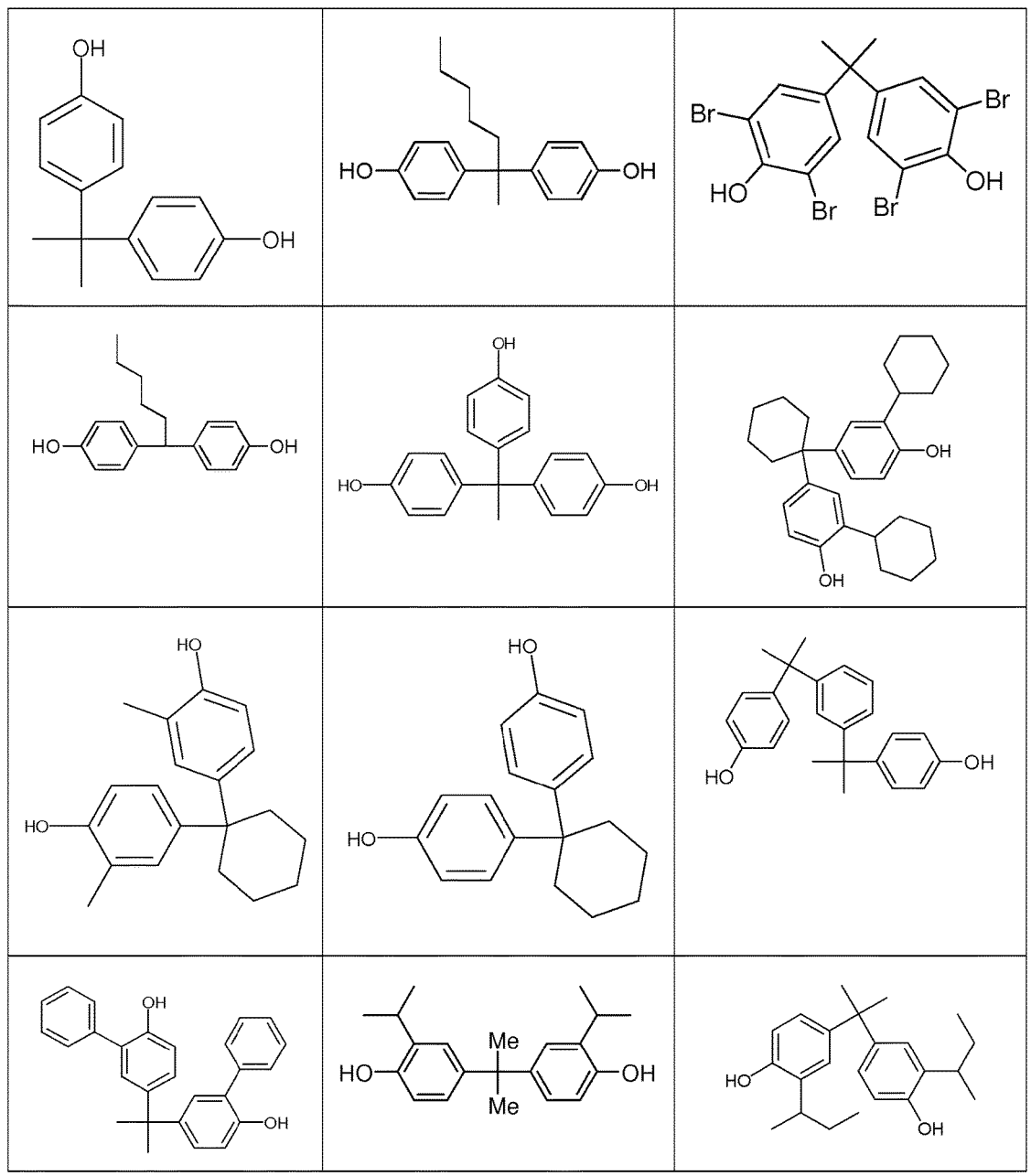
FIG. 2 depicts useful developers for use with red dyes of the class depicted in FIG. 4.
Figure 3:
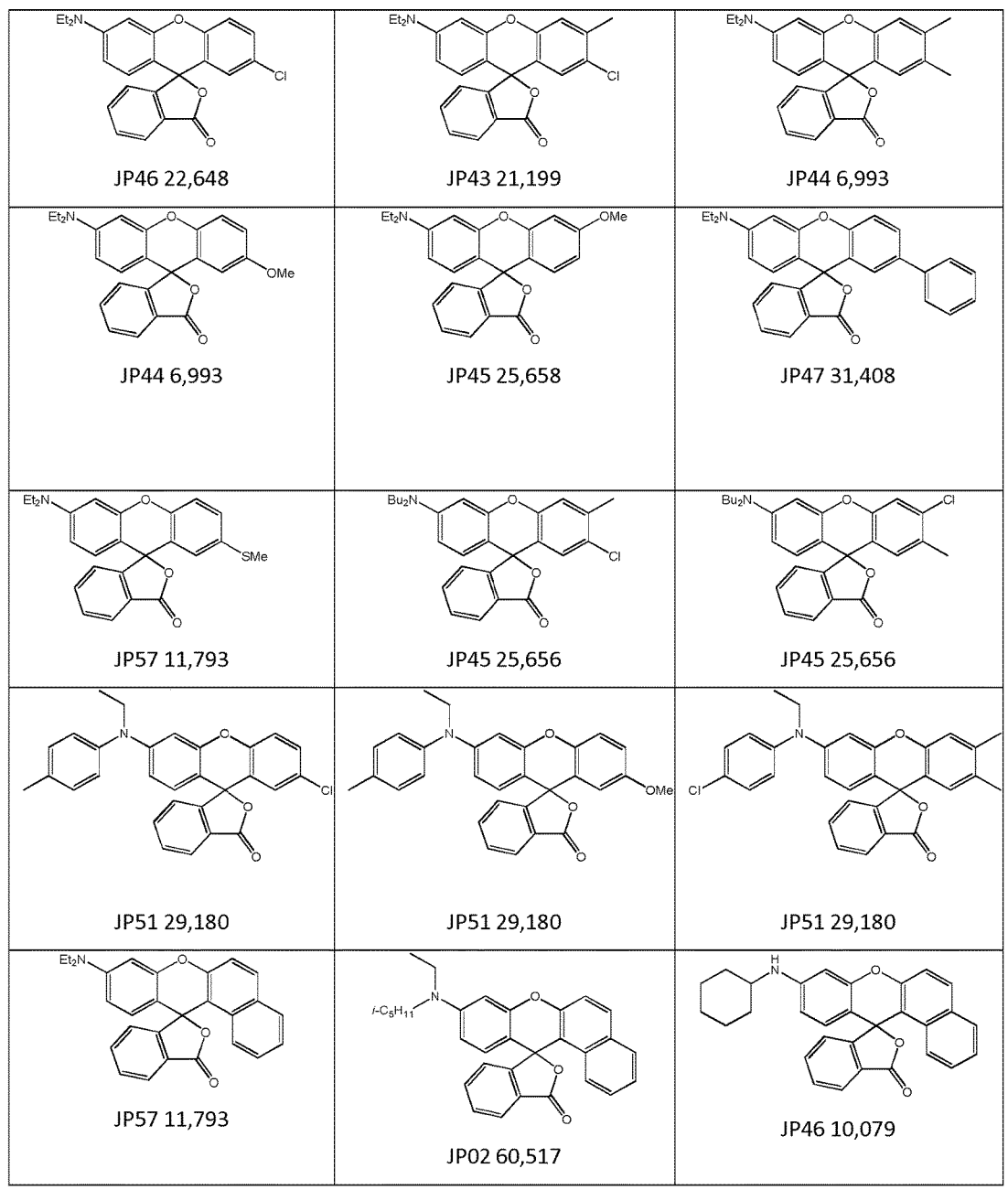
FIG. 3 depicts exemplary fluorans that develop red shade color with suitable developers.

Useful developers for use with red dyes of this class are provided, without limitation, in FIG. 2.

Microencapsulation

The red mixed with the specific developers of FIG. 2 may be dissolved in fatty esters such as methyl palmitate, isopropyl palmitate, isopropyl palmitate, methyl stearate, stearyl behenate, or alcohols such as myristyl alcohol, behenyl alcohol, tetradecanol, or amides such as stearamide, stearylstearamide, or mixtures of such fatty esters, alcohols, or amides at 90° C. to 140° C. The resulting liquid is then dispersed by addition to a dispersing polymer such as ethylene maleic acid dissolved in distilled water at 2.72 wt % and neutralized to pH 3.95 by addition of triethanolamine, at 75° C. under high shear in a homogenizer with rotor-stator speed at 9900 rpm for 0.5 to 4 minutes. Melamine formaldehyde resin is then added and the oil dispersion is encapsulated at high shear for 30 to 90 seconds and then stirred at 65-75° C. for 2 hours to complete the cross-linking reaction. The aqueous pigment slurry produced by this process has particle sizes less than 5 microns and when drawn-down on ink test paper and dried, the pigment coating shows reversible thermochromic properties when cooled to the solidification point of the fatty ester, alcohol, amide, or a blend designed to obtain a specific temperature for full color formation. Such pigments can be designed to have a range of temperature for transition from full absorption temperature (full absorption color or UVA absorption point) to no color or no UVA absorption temperature (clearing point) of 2-7° C.

As an example, an emulsion mixture used to form the microcapsules may be formulated as premixtures in three parts described below. Microencapsulation techniques are well known in the literature.

Part I, an aqueous solution that contains water and optionally other polar solvents that are miscible with water constitutes an aqueous phase of the emulsion. Water is the preferred solvent. This is mixed to substantial homogeneity with a surfactant material that is used as an emulsifier or emulsion stabilizer. The emulsifier may suitably include, for example, nonionic, anionic, cationic, or zwitterionic surfactants, polymers or copolymers, or reactive diluents such as aliphatic or cycloaliphatic glycidyl ethers. Nonionic surfactants are preferred.

Part II, an internal phase mixture constitutes any of the internal phase materials described below and is generally insoluble with the aqueous phase. These materials are combined to form thermochromic systems using ratios and as are known in the art. Although there may be additional additives as described below, the essential internal phase components include a leuco dye, a developer for the leuco dye, and a carrier such as a microcrystalline wax which may alternatively be an ester and/or alcohol.

Part III, an amine-formaldehyde resin solution. This is preferably of the class known as having high amine content, as this increases solubility of the resin in water. This is mixed with water or another compatible polar solvent, preferably in an amount where the water ranges from 40% to 60% of the amine formaldehyde resin solution.

The foregoing pre-mixtures are maintained at respective temperature profiles to facilitate further mixing under conditions of high shear mixing. The aqueous solution is maintained at a temperature ranging from 75-85° C. For example, this may be done in a reaction vessel that is jacketed for temperature control.

In a preferred mixing order, the internal phase solution is poured into the aqueous solution under high shear conditions. Once the emulsion is generated, the amine-formaldehyde solution (Part II) is added and the capsule walls form. The encapsulation process is complete.

The resulting microencapsulated pigments are very useful for manufacture of inks, coatings, and injected molded plastic products. The slurry may dewatered to facilitate these uses. This may be done by first drying the slurry in a steam kettle or via spray drying prior to formulation into inks or coating compositions or extrusion into thermoplastic polymers to produce pellet concentrates for manufacture of injection molded thermochromic plastic products such as cups, cup lids, jars, straws, stirrers, container sleeves, shrink wrap labels. For example, thermochromic compositions were identified that permit generation of high quality saturated photographic quality yellow color that not only is very desirable for beer indicator, but is also very useful to formulate with other two primary color, blue and red inks to make all other new secondary colors inks such as orange, brown, and green colors by mixing.

Microencapsulation Example

With the general procedure described above, three slurries and their inks were made with the following three red dyes: A representative red dye as disclosed in Formula I (Inventive red dye), the two dye system from a mixture of magenta dye and orange dye (Control red 1), and a typical fluoran-based red dye disclosed in prior arts (Control red 2):

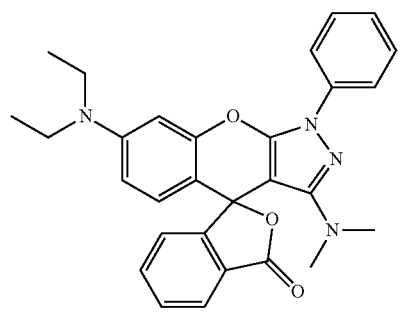
Inventive red dye
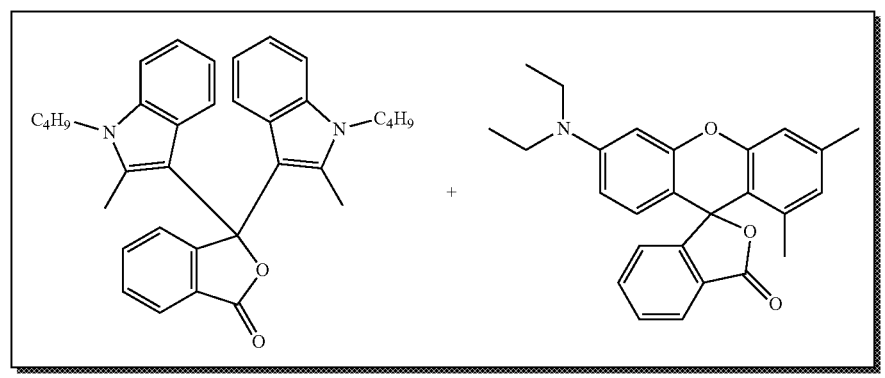
Control red 1
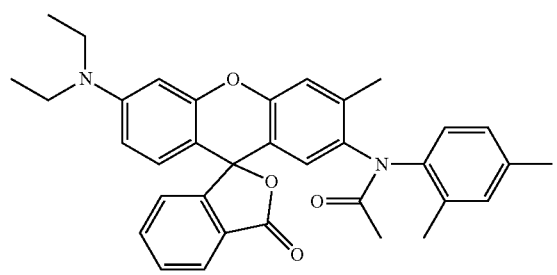
Control red 2
Photographs of TLC plates of these three dyes developed by the acidic silica gel on the plates, slurries drawdown after cold spay, aluminum cans printed with inks made from these three slurries at the warm off-state as well as cold on-state were tested for color stability.
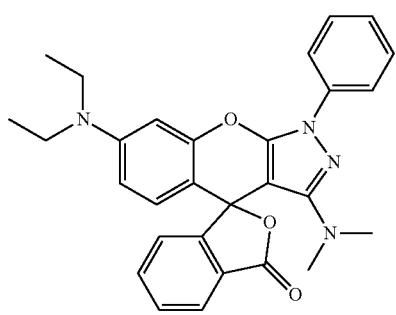
Inventive red dye -continued

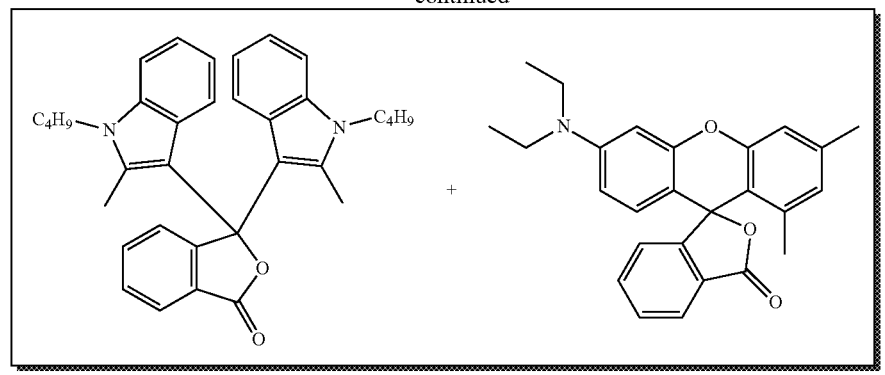

Control red 1

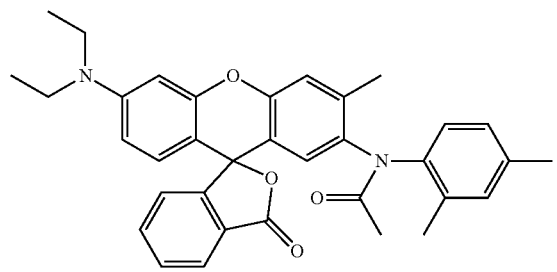

Control red 2

Both the slurry and the can made from the inventive red dye had higher color density when cold sprayed.

Q-sun exposure was performed for 8 hours on respective coating specimens produced using these dyes. Clearly, the ink from the inventive red dye was much more stable than the other two red inks known in the prior art. The red ink from the inventive red dye lasted more than 8 hours, while the other two inks lasted about 1 hour with drastic shade change—an undesirable property. The light stability comparison results of the red ink disclosed in this invention with the inks made from the dyes disclosed in prior arts was summarized below in Table 5:

TABLE 5

| Dye | UV Stability of the ink from the dye (QSUN) (hour) |
|---|---|
|  | 8+ |

TABLE 5-continued

| Dye | UV Stability of the ink from the dye (QSUN) (hour) |
|---|---|
|  | 1 |
|  | 1 |

The invention claimed is:

1. A thermochromic dye having the following formula:

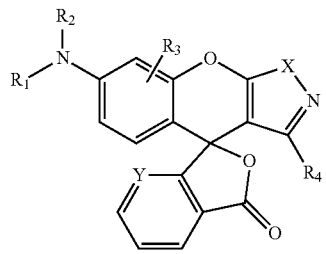

wherein:

X is independently nitrogen substituted by hydrogen, nitrogen substituted by an alkyl group, nitrogen substituted by an aryl group, oxygen, or sulfur;

Y is independently methine or nitrogen;

$R_1$ and $R_2$ are each independently hydrogen, substituted or non-substituted aryl, substituted or non-substituted alkyl, or $R_1$ and $R_2$ are each alkyl wherein, together with the nitrogen to which each alkyl group is bonded, form a morpholinyl ring;

$R_3$ is independently hydrogen, halo, nitro, substituted or non-substituted amine, substituted or non-substituted alkyl, or substituted or non-substituted phenyl; and $R_4$ is independently mono-substituted or bis-substituted phenyl amine, phenyl substituted by a dialkyamine in the para-position, mono-substituted or bis-substituted alkyl amine, or a bis-substituted alkyl amine wherein each alkyl group, together with the nitrogen to which each alkyl group is bonded, form a cyclic amine.

2. The thermochromic dye of claim 1, wherein said thermochromic dye is microencapsulated to form a microencapsulated thermochromic system.

3. The thermochromic dye of claim 2, wherein said microencapsulated thermochromic pigment comprises a proton-donating developer formulated as a proton-donating developer solution.

4. The thermochromic dye of claim 3, wherein said proton-donating developer is selected from the group consisting of:

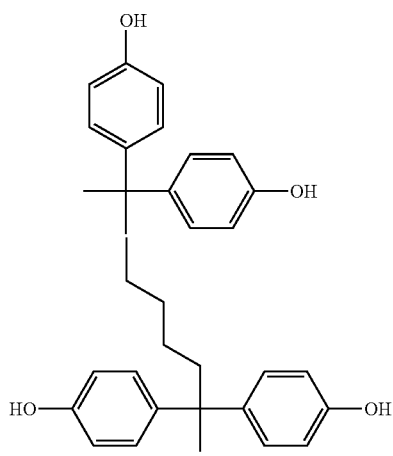

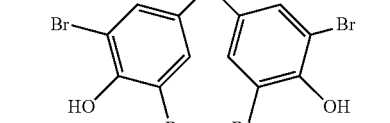

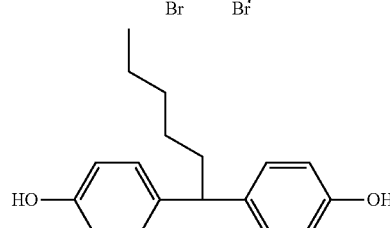

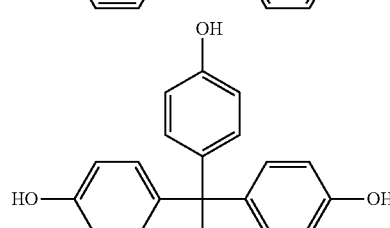

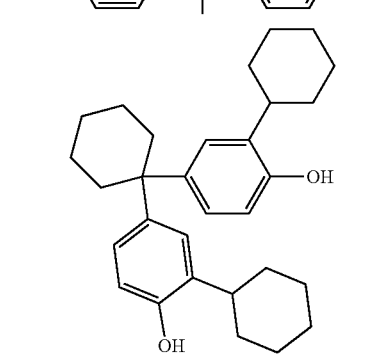

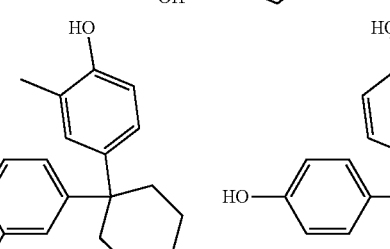

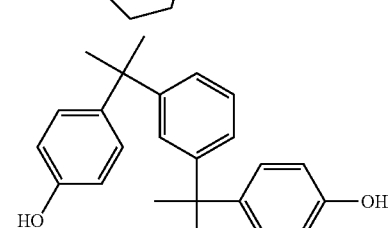

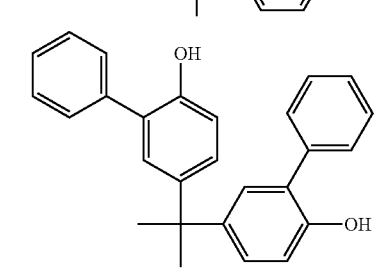

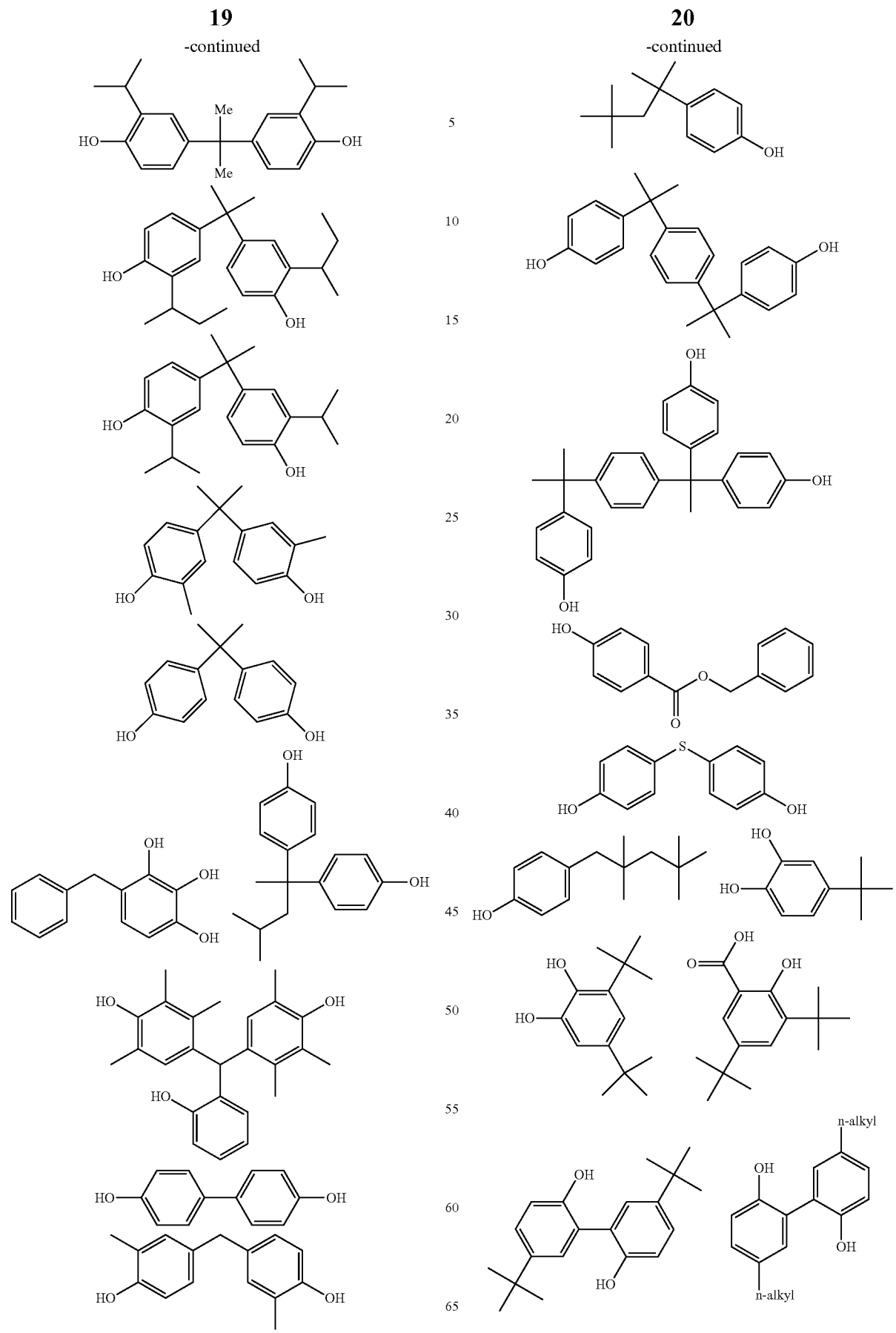

-continued

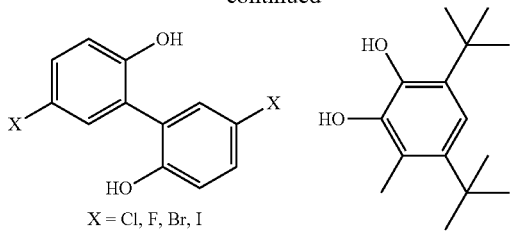

X = Cl, F, Br, I

5. The thermochromic dye of claim 2, wherein said microencapsulated thermochromic pigment is incorporated into a coating.

6. The thermochromic dye of claim 2, wherein said microencapsulated thermochromic pigment comprises a color transition temperature which acts as a level indicator by sensing a matter temperature of matter retained within a wall of a container, said container disposed in an environment having an environment temperature in a range of between about −5° C. to about 75° C.

7. The thermochromic dye of claim 2, wherein said thermochromic dye combines with one or more additional thermochromic dyes to provide a color selected from the group consisting of: a secondary color, a tertiary color, and combinations thereof.

8. A thermochromic dye having the following formula:

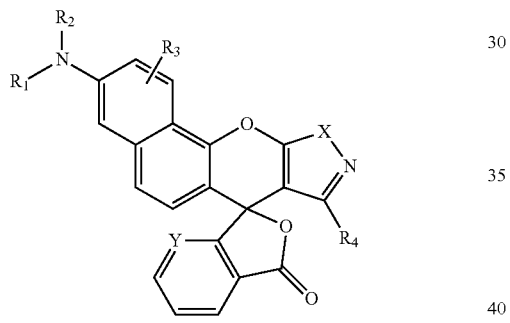

wherein:
X is independently nitrogen substituted by hydrogen, nitrogen substituted by an alkyl group, nitrogen substituted by an aryl group, oxygen, or sulfur;
Y is independently methine or nitrogen;
$R_1$ and $R_2$ are each independently hydrogen, substituted or non-substituted aryl, substituted or non-substituted alkyl, or $R_1$ and $R_2$ are each alkyl and, together with the nitrogen to which each alkyl group is bonded, form a morpholinyl ring;
$R_3$ is independently hydrogen, halo, nitro, substituted or non-substituted amine, substituted or non-substituted alkyl, or substituted or non-substituted phenyl; and
$R_4$ is independently mono-substituted or bis-substituted phenyl amine, phenyl substituted by a dialkyamine in the para-position, mono-substituted or bis-substituted alkyl amine, or a bis-substituted alkyl amine wherein each alkyl group, together with the nitrogen to which each alkyl group is bonded, form a cyclic amine.

9. The thermochromic dye of claim 8, wherein said thermochromic dye is microencapsulated to form a microencapsulated thermochromic pigment.

10. The thermochromic dye of claim 9, wherein said microencapsulated thermochromic pigment comprises a proton-donating developer formulated as a proton-donating developer solution.

11. The thermochromic dye of claim 10, wherein said proton-donating developer is selected from the group consisting of:

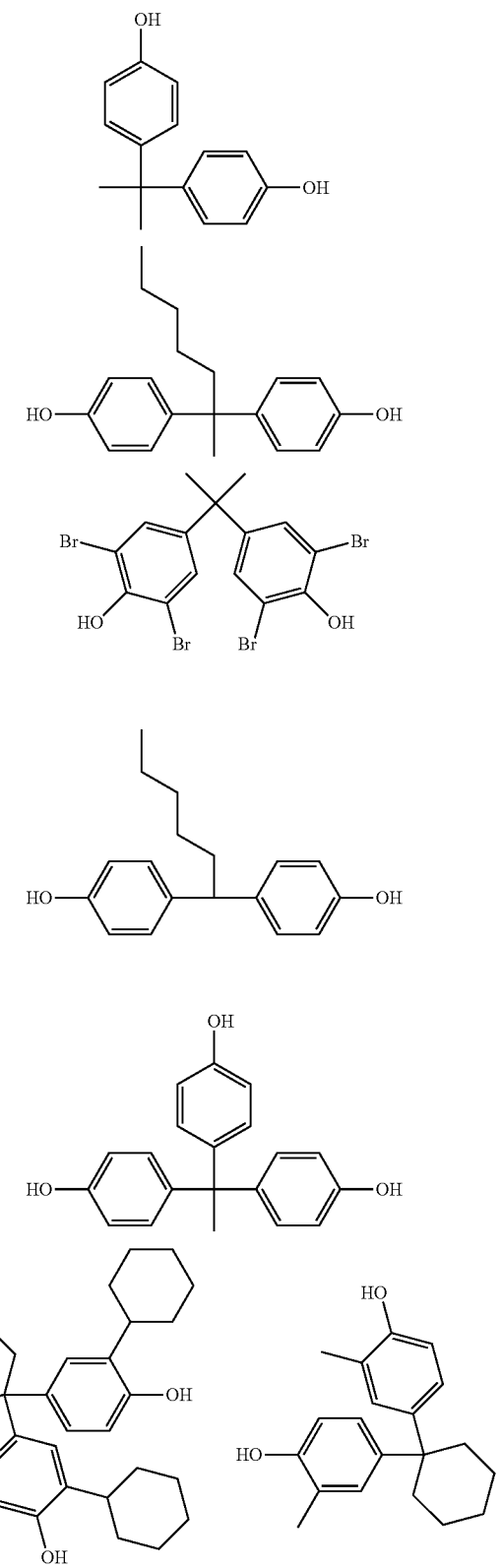

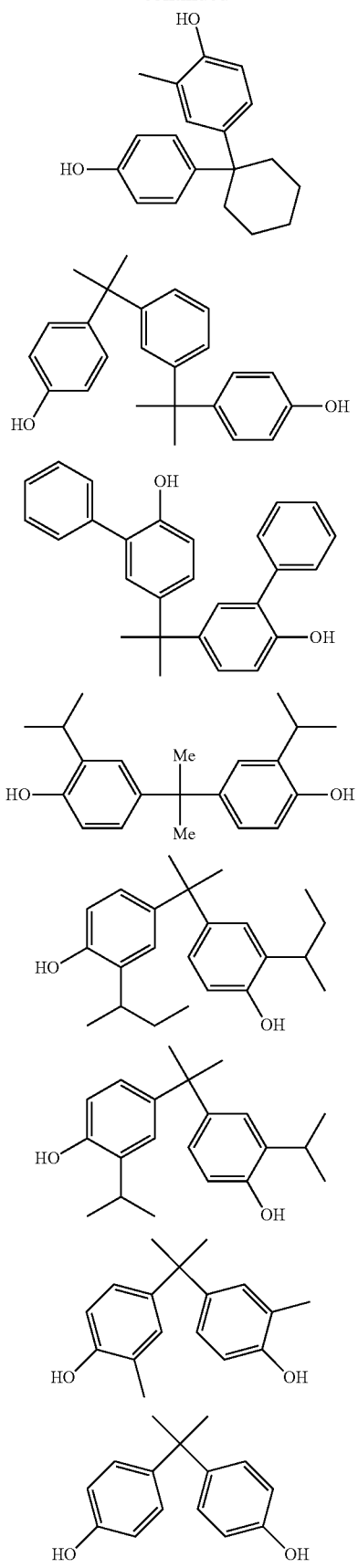
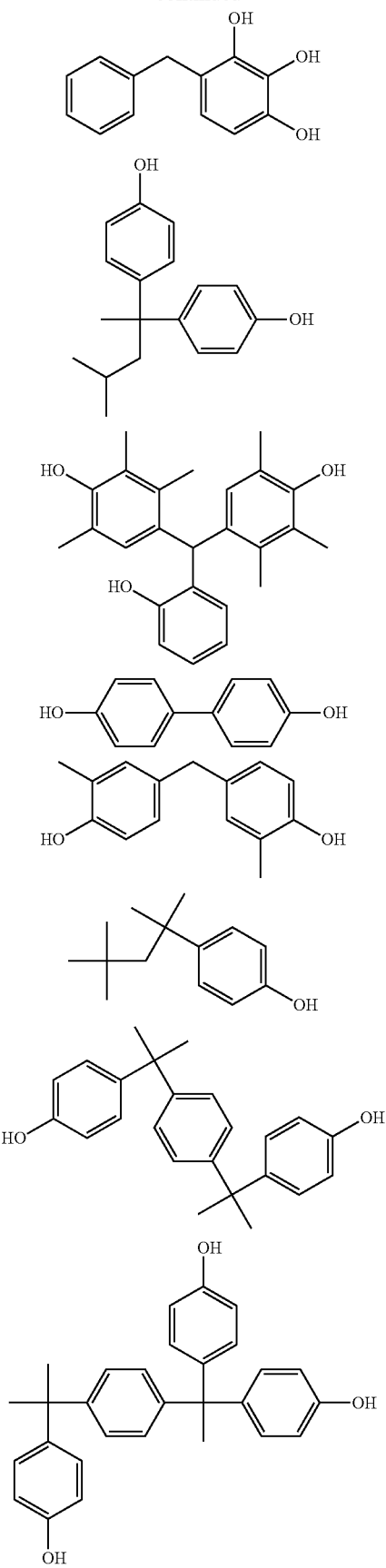

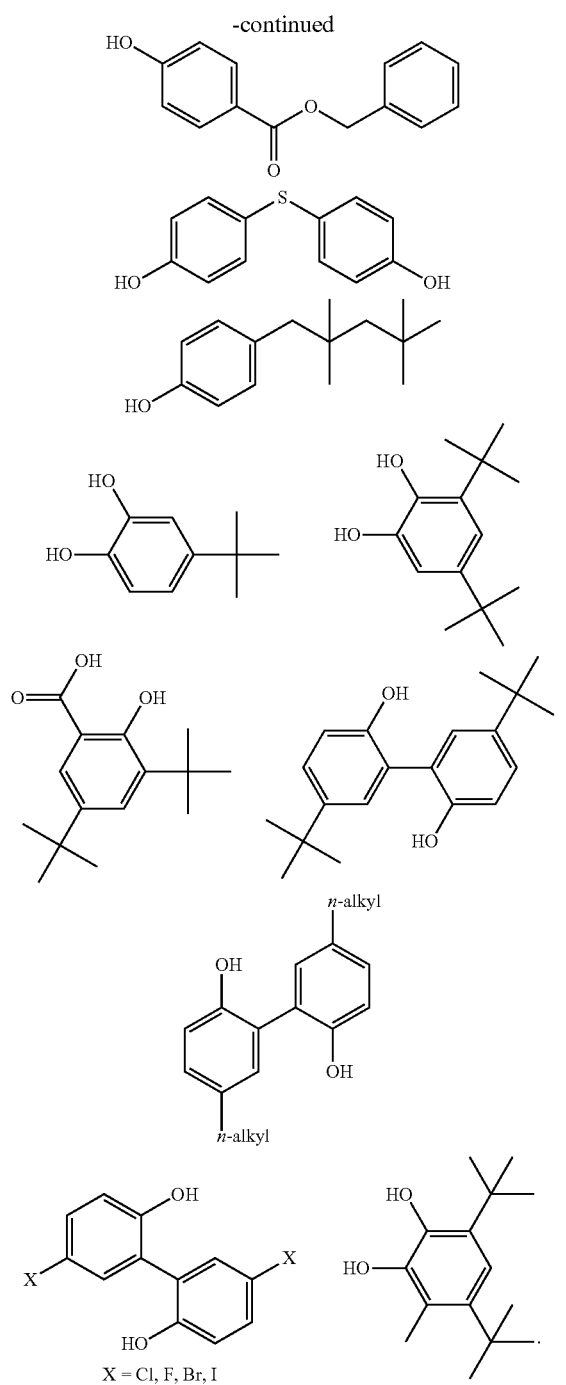

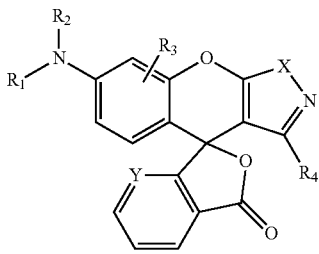

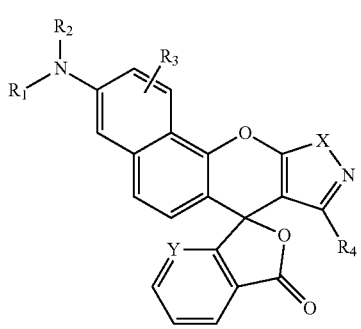

12. The thermochromic dye of claim 9, wherein said microencapsulated thermochromic pigment is incorporated into a coating.

13. The thermochromic dye of claim 9, wherein said microencapsulated thermochromic pigment comprises a color transition temperature which acts as a level indicator by sensing a matter temperature of matter retained within a wall of a container, said container disposed in an environment having an environment temperature in a range of between about −5° C. to about 75° C.

14. The thermochromic dye of claim 9, wherein said thermochromic dye combines with one or more additional thermochromic dyes to provide a color selected from the group consisting of: a secondary color, a tertiary color, and combinations thereof.

15. A microencapsulated thermochromic pigment comprising:
 a thermochromic dye having the following formula:

wherein:
 X is independently nitrogen substituted by hydrogen, nitrogen substituted by an alkyl group, nitrogen substituted by an aryl group, oxygen, or sulfur;
 Y is independently methine or nitrogen;
 $R_1$ and $R_2$ are each independently hydrogen, substituted or non-substituted aryl, substituted or non-substituted alkyl, or $R_1$ and $R_2$ are each alkyl wherein, together with the nitrogen to which each alkyl group is bonded, form a morpholinyl ring;
 $R_3$ is independently hydrogen, halo, nitro, substituted or non-substituted amine, substituted or non-substituted alkyl, or substituted or non-substituted phenyl; and
 $R_4$ is independently amino, amine, mono-substituted or bis-substituted phenyl amine, phenyl substituted by a dialkyamine in the para-position, mono-substituted or bis-substituted alkyl amine, or a bis-substituted alkyl amine wherein each alkyl group, together with the nitrogen to which each alkyl group is bonded, form a cyclic amine; and
 a proton-donating developer formulated as a proton-donating developer solution.

16. A microencapsulated thermochromic pigment comprising:
 a thermochromic dye having the following formula:

wherein:
 X is independently nitrogen substituted by hydrogen, nitrogen substituted by an alkyl group, nitrogen substituted by an aryl group, oxygen, or sulfur;
 Y is independently methine or nitrogen;
 $R_1$ and $R_2$ are each independently hydrogen, substituted or non-substituted aryl, substituted or non-substituted alkyl, or $R_1$ and $R_2$ are each alkyl and, together with the nitrogen to which each alkyl group is bonded, form a morpholinyl ring;

$R_3$ is independently hydrogen, halo, nitro, substituted or non-substituted amine, substituted or non-substituted alkyl, or substituted or non-substituted phenyl; and $R_4$ is independently amino, amine, mono-substituted or bis-substituted phenyl amine, phenyl substituted by a dialkyamine in the para-position, mono-substituted or bis-substituted alkyl amine, or a bis-substituted alkyl amine wherein each alkyl group, together with the nitrogen to which each alkyl group is bonded, form a cyclic amine; and a proton-donating developer formulated as a proton-donating developer solution.

\* \* \* \* \*